Jan. 18, 1949.  L. A. WELLS ET AL  2,459,205
MOLD FOR MAKING PLASTIC ARTIFICIAL EYES
Filed July 2, 1946  2 Sheets-Sheet 1
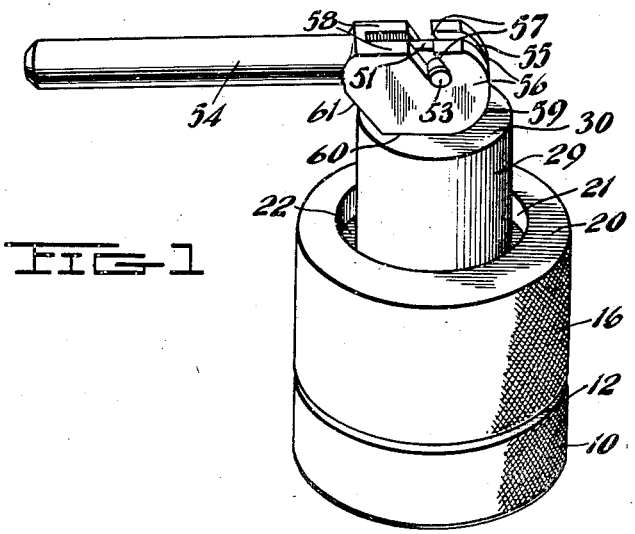
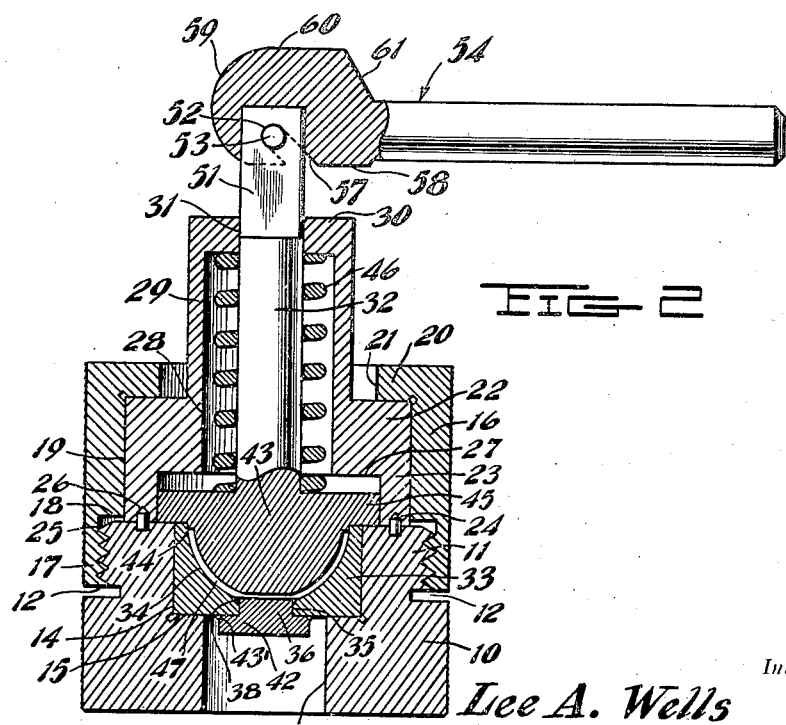
Inventors
*Lee A. Wells*
*Charles A. Halbkat*
By *Clarence A. O'Brien*
and *Harvey B. Jacobson*
Attorneys Jan. 18, 1949.  L. A. WELLS ET AL  2,459,205
MOLD FOR MAKING PLASTIC ARTIFICIAL EYES
Filed July 2, 1946  2 Sheets-Sheet 2
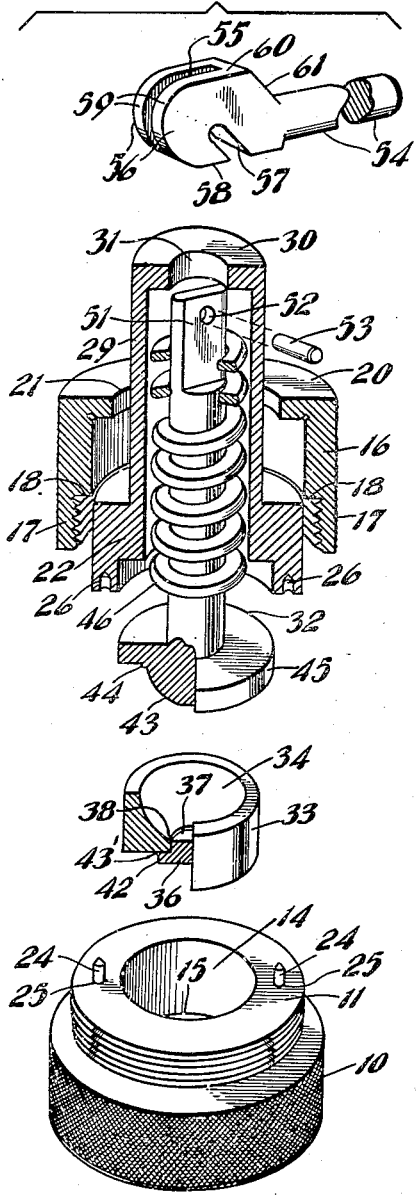
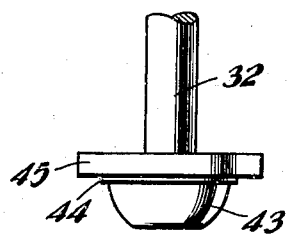
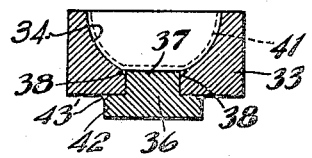
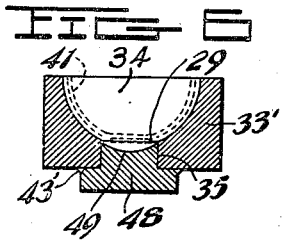
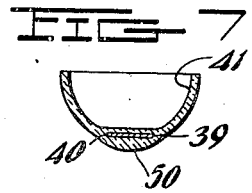
Inventors
*Lee A. Wells*
*Charles A. Halhkat*
By *Clarence A. O'Brien*
and *Harvey B. Jacobson*
Attorneys Patented Jan. 18, 1949

2,459,205

UNITED STATES PATENT OFFICE 2,459,205

MOLD FOR MAKING PLASTIC ARTIFICIAL EYES

Lee A. Wells and Charles A. Halbkat, Houston, Tex.

Application July 2, 1946, Serial No. 681,076

7 Claims. (Cl. 18—34)

This invention relates to a novel and simple mold for making plastic artificial eyes and for practising the method or process as particularly devised for making plastic artificial eyes as set forth in our prior application co-pending herewith, Serial No. 648,122, filed February 16, 1946, with the eyes in the required or established forms and of varied sizes to closely imitate the human eye and to properly fit the socket of a human eye including likenesses of the sclera, iris or color portion and the cornea of the human eye so as to be adapted for persons with eyes of different sizes and colors.

Another object of the invention is to provide a mold or apparatus for producing plastic or acrylic artificial eyes and for greatly facilitating the molding thereof as well as carrying out the steps in producing the article and method described in the foregoing application in producing the sclera, the cornea and in assembling of the same with the iris disc, so as to produce the complete assembled artificial eye.

Another object of the invention is to provide a mold, which permits the use of mold parts of different sizes so that the parts of the plastic eye and the assembly thereof and especially the cornea of clear plastic or acrylic may be produced over the sclera, which is a milky white plastic formed with a seat to receive a disc ornamented to imitate the iris, may be produced under heat and pressure to result in a single complete body in which the clear plastic or acrylic of the cornea is fused into the plastic of the sclera after the latter has been properly ornamented, to produce a single unit of the parts fused together forming the complete plastic eye.

Another object of the invention is to provide a mold of simple, novel and economical construction which retains the mold parts in assembled relation for readily forming the parts of the artificial eye, and which can be actuated to mold the same under pressure and heat and permit convenient carrying out of the progressive steps of the molding operation, while holding the parts in assembled relation to properly interact in the molding thereof and for releasing and opening the mold so that the various progressive steps can be easily carried out with great facility and dispatch.

Other objects and advantages reside in the details of construction and operation as more fully hereinafter described and claimed, reference being had to the accompanying drawings forming part hereof, wherein like numerals refer to like parts throughout, and in which:

Figure 1 is a perspective of a mold for making plastic artificial eyes in accordance with the invention.

Figure 2 is a central vertical diametrical sectional view thereof.

Figure 3 is an exploded view of the complete mold, partly in elevation and partly in section.

Figure 4 is a detail fragmentary side elevation of the actuating plunger and coacting upper mold part carried thereby.

Figure 5 is a detail sectional view of the coacting lower mold part for producing the sclera of the artificial eye.

Figure 6 is a detail sectional view of a corresponding lower mold part for producing the cornea and assembled plastic eye in connection with the sclera and fusing the plastic or acrylic thereof together, and Figure 7 is a sectional view of the complete assembled plastic artificial eye.

Referring to the drawings in detail, in which like reference characters designate corresponding parts throughout the several views, the mold, which is preferably of metal and more particularly steel of suitable character, comprises a lower mold section or base 10 which may be of circular or other outline and is provided with an upper reduced externally threaded portion 11 of smaller diameter than the base 10, and preferably provided with an undercut 12 formed as an annular recess between the base proper and the threaded portion. At the inside, the base 10 is preferably provided with a central axial circular bore 13 and an enlarged upper bore or recess 14 communicating with the top surface thereof and forming an upwardly facing seat shoulder or stop 15 annularly around the central lower bore 13, which extends through the bottom of the base 10. The threaded portion 11 is designed to receive a flanged cap 16 forming the upper section of the mold, which has an outwardly enlarged internally threaded bore or flange 17 at the bottom thereof, which is freely open. This produces a downwardly facing stop or shoulder 18 above the internally threaded portion 17, while the upper portion of the cap has its bore or hollow cavity 19 of smaller diameter than the portion 17 and is formed with an inwardly extending annular flange 20 at the top having an internal circular bore 21 therethrough.

The top of the mold includes a top section proper 22 which is received within the bore 19 of the cap 16 before the latter is threaded on the portion 11 of the base 10, and the body thereof is provided with an annularly depending outer flange 23 adapted to engage the top surface of the portion 11. In order to align these portions so that they will always fit properly together, dowel pins 24 may be mounted in coacting seats, recesses or holes 25 preferably provided at diametrically opposite points in the top of the reduced portion 11 of the base 10 to receive the flat lower ends of the dowel pins 24, while the flange 23 may be provided with suitable similarly located tapered seats, recesses or holes 26, usually formed by the drill in producing the same. Thus, when the top section of the mold is placed on the base, the parts will assume the same relative positions and be perfectly aligned.

The flange 23 by being formed at or near the periphery of the section 22 or by counter-boring the lower surface of the section 22, produces a right angular annular recess or a downwardly facing shoulder 27 internally with the flange 23. The section 22 also has an internal relatively large bore 28 which extends up through an annular top sleeve or neck 29 formed as an upward extension or flange on the top and inner surface of the section 22, which may be provided with an integral or separable attached top wall 30 forming the head thereof and of suitable thickness preferably greater than that of the annular sleeve portion 29. The head 30 is also provided with a small internal bore 31 axially or centrally therethrough to take a plunger 32 also of cylindrical form.

The recess 14 and seat 15 are adapted to support a lower mold section or cup 33 recessed and concaved on the inside, as indicated at 34 and formed of a curvature to correspond with the convex curvature of the sclera of the human eye which the plastic eye formed therein is adapted to fit or replace, and thus made of various sizes and curvatures with varying radii. The top edge of the mold section 33 conforms exactly and is on the same plane with the top of the reduced portion 11 of the base 10 as clearly shown in the drawings and centrally at the bottom, the section 33 is formed with a small circular bore 35 designed to take a plug 36 having a reduced upper portion or half with a flat top face 37 which projects slightly above the concave face 34 at the central bottom portion thereof, or in direct line therewith horizontally, providing said concaved face or recess 34 is provided with an annular tapered recess 38 around the reduced upper portion of the plug 36, so as to form a seat or recess 39 in the plastic of the sclera, and a lip or bezel for an iris disc 40, which is painted or otherwise suitably ornamented to imitate the pupil and colored iris portion of the eye and sclera 41, indicated in dotted lines in Figure 5, which is formed within the recess 34, and suitably ornamentally colored to correspond with the eye of the person whose natural eye is being imitated. The lower portion of the plug 36 is provided with a flange 42 with a surrounding top edge chamfer forming a recess annularly around the same when the reduced portion 36 at the top is fitted in the bore 35, the top of the flange 42 will engage the bottom face of the mold section 33 within the bore 13 so as to properly fit the mold section 33, which forms a cup in which the eye sections are produced, and the plug 36 is soldered, welded, or otherwise connected to the bottom of the mold section 33 at the annular recess formed by the top edge chamfer of the flange 42 as indicated at 43, such as with silver solder.

These lower sections or cups 33 of the mold, may be made in various sizes according to the different eyes to be formed thereby and fitted to the person who will use them.

Coacting with the mold sections or cups 33 is a convex upper mold section 43 adapted to interfit or fit within the cup 33 and formed or mounted on the lower end of the plunger 32 within the annular bottom counter bore of the flange 23 below the shoulder or stop 27 facing downwardly. This convex or rounded section 43 and the curvature and size thereof will vary for different sizes of eyes to be fitted. The top of the section 43 is formed with an annular shoulder 44 beneath the bottom face of a top plate portion or flange 45 which shoulder 44 fits in the recess 34 of cup 33 and flange 45 is adapted to engage the upper surface of the cup or mold section 33 and extend over the joint between the same and the top reduced portion 11 of the base 10, as clearly shown in Figure 2 of the drawings. Expansible means are provided between the top wall 30 and the flange 45 around the plunger 32, and is shown in the form of an expansible coil spring 46, which tends to hold the mold section 43 down in the recess of the cup or mold 33 while the shoulder 44 forms the end or edge of a cavity 47 between the mold sections of the cup and plunger which coact in the base, and in which the necessary plastic or acrylic is inserted in plastic form and cured under heat and pressure to produce the sclera of the artificial plastic eye with a recess or seat 39 to receive the iris disc 40 as previously described.

In order to form the cornea and assembled plastic eye, an additional cup 33' corresponding to the cup 33, is provided as shown in Figure 6 of the drawings and is the same as will be noted by comparison with the cup 33 shown in Figure 5 except that the concavity 34 is larger to accommodate the outer and cornea wall. In this instance, a plug 48 is fitted in the bore 35 in the cup and has a reduced portion at the top the same as the plug 36, but instead of being formed flat at the top, is provided with a top convexity or concavity 49, formed on a smaller arc or radius than the cup cavity 34 of the cups 33 and 33' so that when the plug is in position, a convex extension is provided on the cavity corresponding substantially to the curvature of the eye cornea or substantially a paraboloid. This results in the central or convex projection of the cornea which is produced from clear plastic or acrylic, as distinguished from the milky white plastic from which the sclera is produced within the cavity 47 with the circular recess or seat 39 to receive the iris disc 40 over which an extension 50 of the cornea is produced in the cup cavity extension 49, while under heat and pressure. The result is a single complete body forming the artificial plastic eye or concavo-convex shell of the artificial eye in which the plastic or acrylic of the cornea is fused into the plastic of the sclera after the latter has been properly ornamented to produce a single unit of parts fused together in the complete assembly. The lower or base portion of the plug 48 also produces a flange as at 42 which is welded, soldered or otherwise secured in position at 43', the same as the plug 36. In order to do this, the top outer corner of the flange 42 of each plug 36 and 38 is preferably chamfered or bevelled off to form an annular tapered crevise or recess for receiving the material by which the soldering or rigid connection 43' made to permanently connect the cup and plug results. Also, it may be pointed out that in each instance the plug is provided with a pressed fit with the bore centrally in the cup and then soldered or otherwise secured as described. In this way, a permanent connection is produced which will withstand all of the pressure thereagainst and by making the plugs and cups in various sizes, as well as the interfitting mold section 43 conforming thereto, all sizes necessary in the resulting artificial plastic eye, will be produced. Thus, it is only necessary to interchange the cups and plungers or upper mold sections in the mold as a whole, in order to accomplish this result.

In order to actuate the plunger 32, the latter is formed with a reduced flattened upper portion 51, having a central hole 52 through the thickness thereof for receiving a pivot pin 53 on which the operating pressure lever or arm 54 is pivotally mounted. This lever or arm forms a handle by which the plunger is actuated and is preferably bifurcated as indicated at 55 to provide spaced aperture jaws or ears 56 disposed in parallel relation to straddle the flattened portion 51 of the plunger 32 and in addition, provided with kerfs or slots 57 running diagonally or in inclined positions with respect to the edges 58 so as to permit the lever to be readily mounted on the projecting ends of the pin 53 which is held in the hole 52 of the reduced upper portion 51 of the plunger 32. The end of the jaws 56 forming an enlarged head on the lever are curved as indicated at 59 eccentrically to the pivot axis, gradually increasing in radius from the slots to the edge portion 60 which is straight, the same as the edges 58 and parallel thereto, and finally extended at an incline or bevelled angle as indicated at 61 to the peripheral surface of the lever 54 at the handle forming portion thereof. In this way, when the lever is in the position shown in Figure 2, the spring 46 is allowed to freely exert downward pressure upon the plunger and movable mold section 43 mating with the cup 33 or 33' and when the lever is swung in a counter-clockwise direction as shown in Figure 2 of the drawings, to the position shown in Figure 1 of the drawings, the eccentric curvature of the edge portions 59 will by engagement with the top of the head 30 of the top section 22 and more particularly the reduced tubular section 29 thereof, cause the plunger 32 and the uppermost section 43 to be elevated against the action of the spring 46 by a camming action so as to open the mold cavity after the sclera or cornea has been formed, as well as after the complete assembly of the plastic artificial eye has been produced by fusing said portions together as previously described under heat and pressure. Of course, it is to be understood that the sclera is first produced using the plug 36 in order to produce the seat or recess 39 for the iris disc 40, this being formed of milky white plastic. After the sclera and iris disc have been suitably ornamented to properly imitate the pupil and iris of the natural eye, as well as the outer convex surface of the sclera, the clear plastic or acrylic to form the cornea is then placed within the mold after the cup 33 has been substituted by the cup 33' or a cup having a plug such as 48, in lieu of the plug 36, with the convex extension forming cavity 49 over the iris portion of the sclera, in producing the cornea, which upon the application of pressure and heat, causes the clear plastic or acrylic of the cornea to be fused in to the plastic of the sclera after the latter has been properly ornamented to produce a single unit of the parts fused together in the complete assembly of the complete artificial eye, as fully set forth in my prior co-pending application referred to above.

Thus, with a mold of the class described, the plastic artificial eyes may be readily produced accurately and expeditiously in imitation of any natural eye of a person who is to be provided with the artificial eye thus produced. It may also be pointed out that the coil spring is designed to exert a uniform pressure of 100 pounds per square inch and is of material resistant to heat and change in temperatures, as well as designed to float so that the necessary pressure will be secured between the upper or male section 43 and the lower female section or cup 33 or 33', in producing the artificial eye in the manner described. My reason of the construction of the mold as described, the parts may be readily assembled or disassembled in replacing the sections of different sizes for producing the artificial eyes in different sizes as explained above.

While in the foregoing there has been shown and described the preferred embodiment of this invention it is to be understood that minor changes in the details of construction, combination and arrangement of the parts may be resorted to without departing from the spirit and scope of the invention as claimed.

What we claim is:

1. In a mold for making plastic artificial eyes, a base section, a cap section removably mounted thereon, a top section held on the base by means of the cap section, a plunger in the top section, a mold cup in the base section having a cavity, a plug inserted centrally in the bottom of the cup cavity and forming a recess at the top and a convex mold section on the plunger said cup and mold section having coacting faces, means in the cap section around the plunger for normally forcing the plunger into operative position and cam means engaged on the plunger and coacting with the cap section for raising the plunger.

2. In a mold for making plastic artificial eyes, a base section, a cap section removably mounted thereon, a top section held on the base by means of the cap section, a plunger in the top section, a mold cup in the base section having a cavity, a plug inserted centrally in the bottom of the cup cavity and forming a recess at the top and a convex mold section on the plunger said cup and mold section having coacting faces, means normally exerting downward pressure on the plunnger to force the convex section into the concaved cup section with a wall forming cavity therebetween, and a lever having means to raise the plunger and for permitting the downward movement thereof.

3. In a mold for making plastic artificial eyes, a base section, a cap section removably mounted thereon, a top section held on the base by means of the cap section, a plunger in the top section, a mold cup in the base section having a cavity, a plug inserted centrally in the bottom of the cup cavity and forming a recess at the top and a convex mold section on the plunger said cup and mold section having coacting faces, means normally exerting downward pressure on the plunger to force the convex section into the concaved cup section with a wall forming cavity therebetween, said cup section having the plug at the bottom thereof to form the central portion of a plastic eye molded in the cavity, and a camming lever pivoted to the plunger and cooperating with the upper end of the top portion at its camming surfaces, to raise the plunger or to release the same for downward movement into molding position.

4. In a mold for making plastic artificial eyes, a base section, a cap section removably mounted thereon, a top section held on the base by means of the cap section, a plunger in the top section, a mold cup in the base section having a cavity, a plug inserted centrally in the bottom of the cup cavity and forming a recess at the top and a convex mold section on the plunger said cup and mold section having coacting faces, means normally exerting downward pressure on the plunger to force the convex section into the concaved cup section with a wall forming cavity therebetween, said cup section having the plug at the bottom thereof to form the central portion of a plastic eye molded in the cavity, and a camming lever pivoted to the plunger and cooperating with the upper end of the top portion at its camming surfaces, to raise the plunger or to release the same for downward movement into molding position, said plug having a flat top face and being rigidly anchored in a bore in the cup, said cup and plug forming a recess whereby a sclera produced in the mold cavity will be formed with said recess to receive an iris disc.

5. In a mold for making plastic artificial eyes, a base section, a cap section removably mounted thereon, a top section held on the base by means of the cap section, a plunger in the top section, a mold cup in the base section having a cavity, a plug inserted centrally in the bottom of the cup cavity and forming a recess at the top and a convex mold section on the plunger said cup and mold section having coacting faces, means normally exerting downward pressure on the plunger to force the convex section into the concaved cup section with a bowl forming cavity therebetween, said cup section having the plug at the bottom thereof to form the central portion of a plastic eye molded in the cavity, and a camming lever pivoted to the plunger and cooperating with the upper end of the top portion at its camming surfaces, to raise the plunger or to release the same for downward movement into molding position, said plug having a reduced portion at the top fitting into a bore centrally in the bottom of the cup and provided with a concave top face of shorter radius than the cavity of the cup for producing a convex projection on the cornea and whereby the plastic of the cornea may be fused into the plastic of the sclera under heat and pressure to form the complete assembled plastic artificial eye.

6. A mold for making plastic artificial eyes comprising a sectional mold having a base section, a cap removably mounted thereon, said base having a top concavity, a cup fitted in said concavity and having a central bottom bore, a flange plug having a reduced portion press fitted in the bore and secured to the bottom of the cup, a top section held in the cap against the base section at the top thereof, a plunger having a convex central bottom portion and a flange to engage the top of the cup and base respectively, a spring on the plunger between the top surface of the convex portion thereof and the top of the mold top section, and a lever pivoted on the upper end of the plunger above the top and having a camming edge cooperating therewith to raise the plunger against the edge of the spring to permit lowering thereof under pressure by the spring.

7. In a mold for making plastic artificial eyes, a base section, a cap section removably mounted thereon, a top section held on the base by means of the cap section, a plunger in the top section, a finishing radius cup assembly in the base section and on the plunger including a mold cup in the base section having an axial bottom opening and a convex mold section on the plunger having coacting faces, a plug in the bottom opening forming an annular recess around the upper end thereof projecting into the cavity with the wall of the cavity, spring means between the plunger and the top of the cap normally forcing the plunger downwardly into operative engagement with the cup and material therein to be molded, and cam means pivoted on the upper end of the plunger above the upper end of the cap, for raising the plunger and mold section thereof.

LEE A. WELLS.
CHARLES A. HALBKAT.

REFERENCES CITED

The following references are of record in the file of this patent:

UNITED STATES PATENTS

| Number | Name | Date |
|---|---|---|
| 685,095 | Browning et al. | Oct. 22, 1901 |
| 1,155,909 | Gibson | Oct. 5, 1915 |
| 1,498,335 | Von Hambach | June 17, 1924 |
| 2,233,057 | Luce | Feb. 25, 1941 |
| 2,266,169 | Cumrine | Dec. 16, 1941 |
| 2,279,952 | Pryor | Apr. 14, 1942 |
| 2,393,549 | McCreery | Jan. 22, 1946 |